US010219263B2

(12) United States Patent
Yang et al.

(10) Patent No.: US 10,219,263 B2
(45) Date of Patent: Feb. 26, 2019

(54) METHOD AND APPARATUS FOR TRANSCEIVING WIRELESS SIGNAL IN WIRELESS COMMUNICATION SYSTEM

(71) Applicant: LG ELECTRONICS INC., Seoul (KR)

(72) Inventors: Suckchel Yang, Seoul (KR); Joonkui Ahn, Seoul (KR); Seungmin Lee, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 44 days.

(21) Appl. No.: 15/329,572

(22) PCT Filed: Jul. 28, 2015

(86) PCT No.: PCT/KR2015/007879
§ 371 (c)(1),
(2) Date: Jan. 26, 2017

(87) PCT Pub. No.: WO2016/018046
PCT Pub. Date: Feb. 4, 2016

(65) Prior Publication Data
US 2017/0251454 A1 Aug. 31, 2017

Related U.S. Application Data

(60) Provisional application No. 62/029,578, filed on Jul. 28, 2014, provisional application No. 62/031,838, (Continued)

(51) Int. Cl.
*H04W 72/00* (2009.01)
*H04W 72/04* (2009.01)
(Continued)

(52) U.S. Cl.
CPC ............ *H04W 72/042* (2013.01); *H04B 7/26* (2013.01); *H04L 5/001* (2013.01); *H04L 5/005* (2013.01);
(Continued)

(58) Field of Classification Search
CPC ........... H04W 72/042; H04W 72/0446; H04W 52/146; H04W 24/08; H04L 5/0048
See application file for complete search history.

(56) References Cited

U.S. PATENT DOCUMENTS

2010/0254471 A1 10/2010 Ko et al.
2013/0322307 A1 12/2013 Yang et al.
(Continued)

FOREIGN PATENT DOCUMENTS

EP 2648448 10/2013
EP 2723122 4/2014
(Continued)

OTHER PUBLICATIONS

PCT International Application No. PCT/KR2015/007879, Written Opinion of the International Searching Authority dated Dec. 1, 2015, 17 pages.
(Continued)

*Primary Examiner* — Brian D Nguyen
(74) *Attorney, Agent, or Firm* — Lee Hond Degerman Kang Waimey

(57) ABSTRACT

The present invention relates to a wireless communication system, specifically to a method comprising the steps of: configuring a PCell of a licensed band and an SCell of an unlicensed band for a base station; receiving resource configuration information concerning the SCell by means of a physical downlink control channel (PDCCH) of the PCell; configuring a subframe set within a temporary time duration on the SCell on the basis of the resource configuration (Continued)

information; and communicating with the base station by means of the subframe set temporarily configured on the SCell, and to an apparatus for the method.

20 Claims, 10 Drawing Sheets

Related U.S. Application Data filed on Jul. 31, 2014, provisional application No. 62/033,661, filed on Aug. 6, 2014, provisional application No. 62/058,682, filed on Oct. 2, 2014, provisional application No. 62/082,064, filed on Nov. 19, 2014, provisional application No. 62/160,620, filed on May 13, 2015.

(51) Int. Cl.
| | |
|---|---|
| *H04B 7/26* | (2006.01) |
| *H04L 5/00* | (2006.01) |
| *H04W 24/08* | (2009.01) |
| *H04W 52/14* | (2009.01) |
| *H04L 27/00* | (2006.01) |
| *H04W 52/40* | (2009.01) |
| *H04W 52/24* | (2009.01) |

(52) U.S. Cl.
CPC .......... *H04L 5/0048* (2013.01); *H04L 5/0092* (2013.01); *H04L 27/0006* (2013.01); *H04W 24/08* (2013.01); *H04W 52/143* (2013.01); *H04W 52/146* (2013.01); *H04W 52/40* (2013.01); *H04W 72/0446* (2013.01); *H04L 5/0044* (2013.01); *H04L 5/0053* (2013.01); *H04W 52/242* (2013.01)

(56) References Cited

U.S. PATENT DOCUMENTS

| | | | |
|---|---|---|---|
| 2013/0322413 A1* | 12/2013 | Pelletier | H04W 72/1289 370/336 |
| 2014/0036881 A1 | 2/2014 | Kim et al. | |
| 2014/0064158 A1* | 3/2014 | Timus | H04W 36/30 370/279 |
| 2014/0334318 A1* | 11/2014 | Pica | H04W 36/14 370/252 |
| 2014/0334320 A1* | 11/2014 | Liu | H04W 52/242 370/252 |
| 2014/0044000 A1 | 12/2014 | Charbit et al. | |
| 2015/0131536 A1* | 5/2015 | Kaur | H04L 5/001 370/329 |
| 2015/0133184 A1* | 5/2015 | Sadek | H04W 16/14 455/552.1 |
| 2015/0156636 A1* | 6/2015 | Tabet | H04W 16/14 370/329 |
| 2015/0223265 A1* | 8/2015 | Fwu | H04W 52/04 370/329 |
| 2015/0351095 A1* | 12/2015 | Wilhelmsson | H04W 72/0453 370/329 |
| 2016/0007207 A1* | 1/2016 | Agardh | H04W 16/14 370/329 |

FOREIGN PATENT DOCUMENTS

| | | |
|---|---|---|
| KR | 1020130121605 | 11/2013 |
| WO | 2013081368 | 6/2013 |

OTHER PUBLICATIONS

European Patent Office Application Serial No. 15826780.7, Search Report dated Mar. 9, 2018, 8 pages.

\* cited by examiner

METHOD AND APPARATUS FOR TRANSCEIVING WIRELESS SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2015/007879, filed on Jul. 28, 2015, which claims the benefit of U.S. Provisional Application No. 62/029,578, filed on Jul. 28, 2014, U.S. Provisional Application No. 62/031,838, filed on Jul. 31, 2014, U.S. Provisional Application No. 62/033,661, filed on Aug. 6, 2014, U.S. Provisional Application No. 62/058,682, filed on Oct. 2, 2014, U.S. Provisional Application No. 62/082,064, filed on Nov. 19, 2014, and U.S. Provisional Application No. 62/160,620, filed on May 13, 2015, the contents of which are all hereby incorporated by reference herein in their entirety.

TECHNICAL FIELD

The present invention relates to a wireless communication system, and more particularly, to a method and apparatus for transmitting/receiving a wireless signal. The wireless communication system includes a CA-based (Carrier Aggregation-based) wireless communication system.

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as code division multiple access (CDMA), frequency division multiple access (FDMA), time division multiple access (TDMA), orthogonal frequency division multiple access (OFDMA), or single carrier frequency division multiple access (SC-FDMA).

DISCLOSURE

Technical Problem

It is an object of the present invention to provide a method and apparatus for efficiently performing operations of transmission and reception of a wireless signal.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

The object of the present invention can be achieved by providing a method for performing communication by a terminal in a wireless communication system, including configuring a primary cell (PCell) of a licensed band and a secondary cell (SCell) of an unlicensed band for a base station, receiving resource configuration information on the SCell through a Physical Downlink Control Channel (PDCCH) of the PCell, configuring a subframe set within a temporary time period on the SCell based on the resource configuration information, and communicating with the base station using the subframe set temporally configured on the SCell.

In another aspect of the present invention, provided herein is a terminal configured to perform communication in a wireless communication system, the terminal including an radio frequency (RF) module, and a processor, wherein the processor is configured to configure a primary cell (PCell) of a licensed band and a secondary cell (SCell) of an unlicensed band for a base station, receive resource configuration information on the SCell through a Physical Downlink Control Channel (PDCCH) of the PCell, configure a subframe set within a temporary time period on the SCell based on the resource configuration information, and communicate with the base station using the subframe set temporally configured on the SCell.

Preferably, the subframe set may include only downlink subframes or only uplink subframes.

Preferably, the subframe set may include one or more uplink subframes and one or more downlink subframes arranged thereafter.

Preferably, a specific signal may be transmitted for a predetermined time after an end time of the one or more uplink subframes.

Preferably, a length of the temporary time period may be pre-indicated through an Radio Resource Control (RRC) message, and a subframe pattern in the subframe set may be indicated using the resource configuration information on the SCell.

Advantageous Effects

According to embodiments of the present invention, wireless signal transmission and reception can be efficiently performed in a wireless communication system.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Embodiments of the present invention are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) evolves from 3GPP LTE.

While the following description is given, centering on 3GPP LTE/LTE-A for clarity, this is purely exemplary and thus should not be construed as limiting the present invention. It should be noted that specific terms disclosed in the present invention are proposed for convenience of description and better understanding of the present invention, and the use of these specific terms may be changed to other formats within the technical scope or spirit of the present invention.

Figure 1:
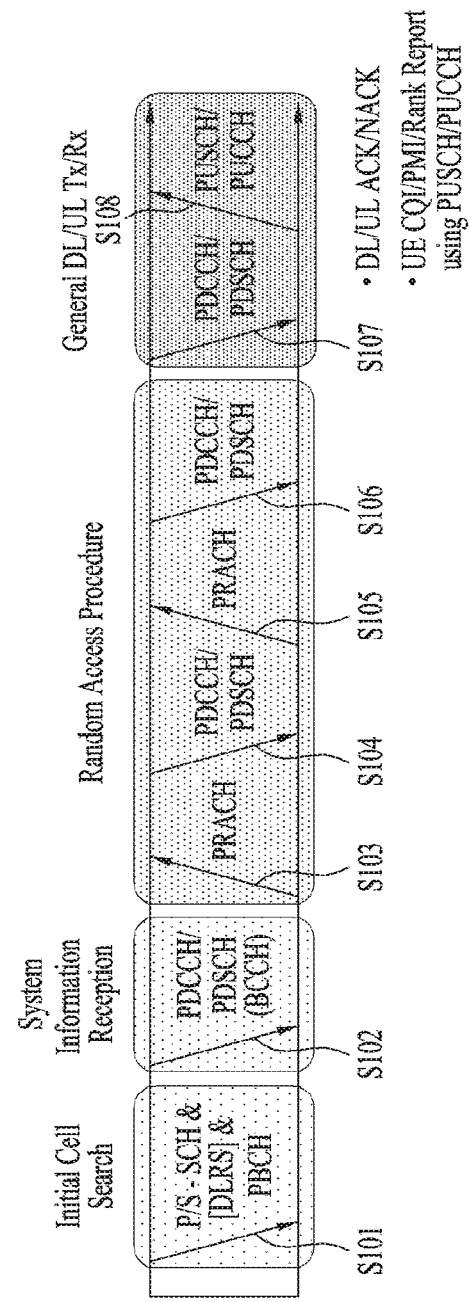
FIG. 1 illustrates physical channels used in 3GPP LTE(-A) and a signal transmission method using the same.

FIG. 1 illustrates physical channels used in 3GPP LTE(-A) and a signal transmission method using the same.

When powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the mean time, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
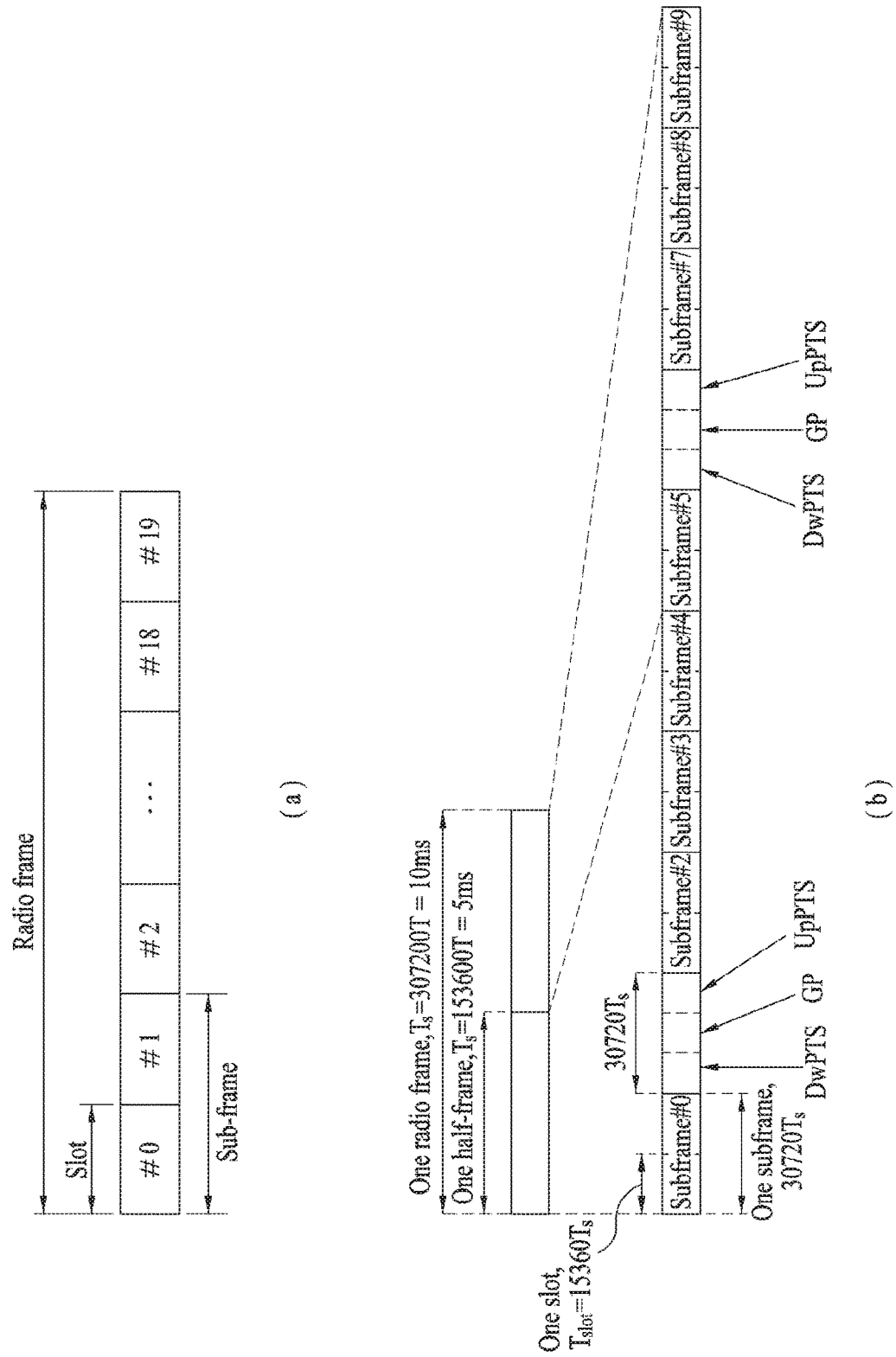
FIG. 2 illustrates a radio frame structure.

FIG. 2 illustrates a radio frame structure. Uplink/downlink data packet transmission is performed on a subframe-by-subframe basis. A subframe is defined as a predetermined time interval including a plurality of symbols. 3GPP LTE supports a type-1 radio frame structure applicable to frequency division duplex (FDD) and a type-2 radio frame structure applicable to time division duplex (TDD).

FIG. 2(*a*) illustrates a type-1 radio frame structure. A downlink subframe includes 10 subframes each of which includes 2 slots in the time domain. A time for transmitting a subframe is defined as a transmission time interval (TTI). For example, each subframe has a duration of 1 ms and each slot has a duration of 0.5 ms. A slot includes a plurality of OFDM symbols in the time domain and includes a plurality of resource blocks (RBs) in the frequency domain. Since downlink uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on cyclic prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2(*b*) illustrates a type-2 radio frame structure. The type-2 radio frame includes 2 half frames. Each half frame includes 4(5) normal subframes and 10 special subframes. The normal subframes are used for uplink or downlink according to UL-DL configuration. A subframe is composed of 2 slots.

Table 1 shows subframe configurations in a radio frame according to UL-DL configurations.

TABLE 1

| Uplink-downlink configuration | Downlink-to-Uplink Switch point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes DwPTS (Downlink Pilot TimeSlot), GP (Guard Period), and UpPTS (Uplink Pilot TimeSlot). DwPTS is used for initial cell search, synchronization or channel estimation in a UE and UpPTS is used for channel estimation in a BS and uplink transmission synchronization in a UE. The GP eliminates UL interference caused by multi-path delay of a DL signal between a UL and a DL.

The radio frame structure is merely exemplary and the number of subframes included in the radio frame, the number of slots included in a subframe, and the number of symbols included in a slot can be vary.

Figure 3:
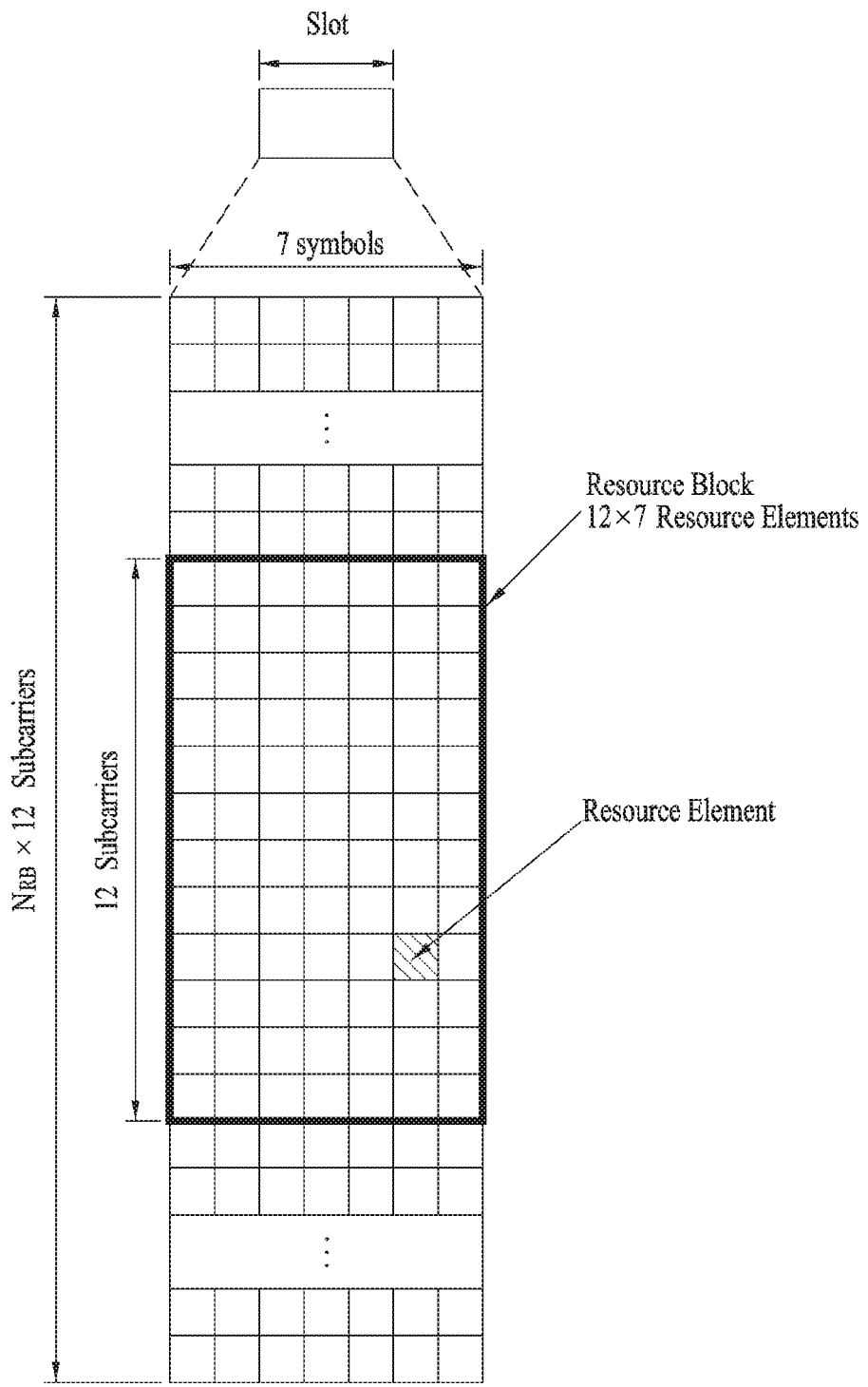
FIG. 3 illustrates a resource grid of a downlink slot.

FIG. 3 illustrates a resource grid of a downlink slot.

Referring to FIG. 3, a downlink slot includes a plurality of OFDM symbols in the time domain. While one downlink slot may include 7 OFDM symbols and one resource block (RB) may include 12 subcarriers in the frequency domain in the figure, the present invention is not limited thereto. Each element on the resource grid is referred to as a resource element (RE). One RB includes 12×7 REs. The number NRB of RBs included in the downlink slot depends on a downlink transmit bandwidth. The structure of an uplink slot may be same as that of the downlink slot.

Figure 4:
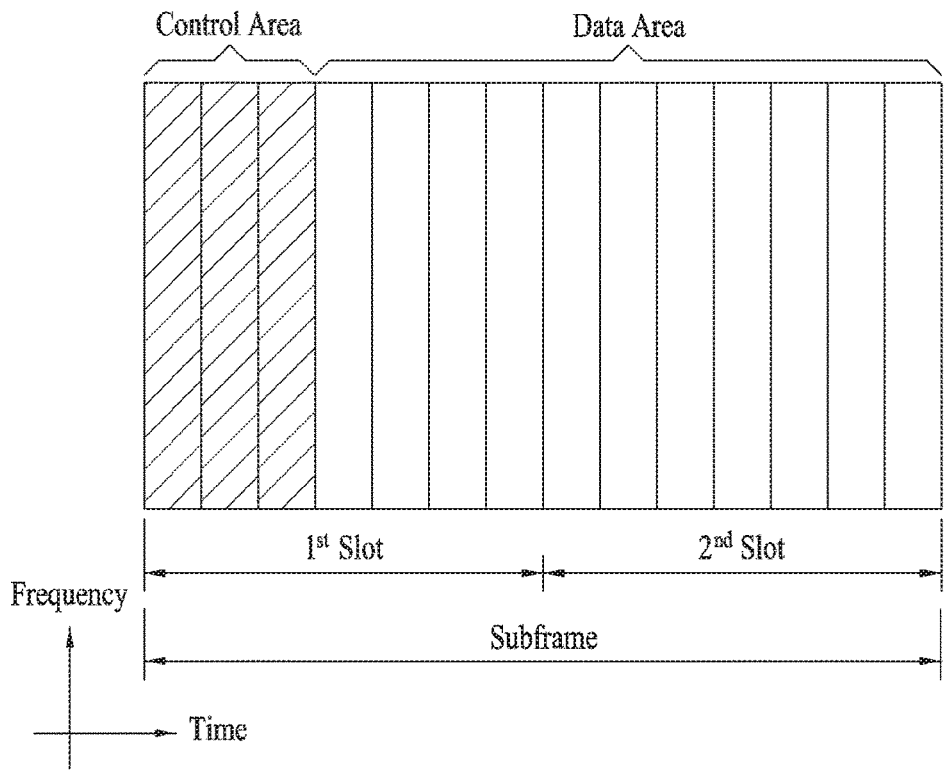
FIG. 4 illustrates a downlink subframe structure.

FIG. 4 illustrates a downlink subframe structure.

Referring to FIG. 4, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. A basic resource unit of the data region is an RB. Examples of downlink control channels used in LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative-acknowledgment (NACK) signal. Control information transmitted through the PDCCH is referred to as downlink control information (DCI). The DCI includes uplink or downlink scheduling information or an uplink transmit power control command for an arbitrary UE group.

Control information transmitted through the PDCCH is referred to as downlink control information (DCI). Formats 0, 3, 3A and 4 for uplink and formats 1, 1A, 1B, 1C, 1D, 2, 2A, 2B and 2C for downlink are defined as DCI formats. Information field type, the number of information fields, the number of bits of each information field, etc. depend on DIC format. For example, the DCI formats selectively include information such as hopping flag, RB assignment, MCS (Modulation Coding Scheme), RV (Redundancy Version), NDI (New Data Indicator), TPC (Transmit Power Control), HARQ process number, PMI (Precoding Matrix Indicator) confirmation as necessary. Accordingly, the size of control information matched to a DCI format depends on the DCI format. A arbitrary DCI format may be used to transmit two or more types of control information. For example, DIC formats 0/1A is used to carry DCI format 0 or DIC format 1, which are discriminated from each other using a flag field.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

The PDCCH carries a message known as DCI which includes resource assignment information and other control information for a UE or UE group. In general, a plurality of PDCCHs can be transmitted in a subframe. Each PDCCH is transmitted using one or more CCEs. Each CCE corresponds to 9 sets of 4 REs. The 4 REs are referred to as an REG. 4 QPSK symbols are mapped to one REG. REs allocated to a reference signal are not included in an REG, and thus the total number of REGs in OFDM symbols depends on presence or absence of a cell-specific reference signal. The concept of REG (i.e. group based mapping, each group including 4 REs) is used for other downlink control channels (PCFICH and PHICH). That is, REG is used as a basic resource unit of a control region. 4 PDCCH formats are supported as shown in Table 2.

TABLE 2

| PDCCH format | Number of CCEs (n) | Number of REGs | Number of PDCCH bits |
|---|---|---|---|
| 0 | 1 | 9 | 72 |
| 1 | 2 | 8 | 144 |

TABLE 2-continued

| PDCCH format | Number of CCEs (n) | Number of REGs | Number of PDCCH bits |
|---|---|---|---|
| 2 | 4 | 36 | 288 |
| 3 | 5 | 72 | 576 |

CCEs are sequentially numbered. To simplify a decoding process, transmission of a PDCCH having a format including n CCEs can be started using as many CCEs as a multiple of n. The number of CCEs used to transmit a specific PDCCH is determined by a BS according to channel condition. For example, if a PDCCH is for a UE having a high-quality downlink channel (e.g. a channel close to the BS), only one CCE can be used for PDCCH transmission. However, for a UE having a poor channel (e.g. a channel close to a cell edge), 8 CCEs can be used for PDCCH transmission in order to obtain sufficient robustness. In addition, a power level of the PDCCH can be controlled according to channel condition.

LTE defines CCE positions in a limited set in which PDCCHs can be positioned for each UE. CCE positions in a limited set that the UE needs to monitor in order to detect the PDCCH allocated thereto may be referred to as a search space (SS). In LTE, the SS has a size depending on PDCCH format. A UE-specific search space (USS) and a common search space (CSS) are separately defined. The USS is set per UE and the range of the CSS is signaled to all UEs. The USS and the CSS may overlap for a given UE. In the case of a considerably small SS with respect to a specific UE, when some CCEs positions are allocated in the SS, remaining CCEs are not present. Accordingly, the BS may not find CCE resources on which PDCCHs will be transmitted to available UEs within given subframes. To minimize the possibility that this blocking continues to the next subframe, a UE-specific hopping sequence is applied to the starting point of the USS.

Table 3 shows sizes of the CSS and USS.

TABLE 3

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

To control computational load of blind decoding based on the number of blind decoding processes to an appropriate level, the UE is not required to simultaneously search for all defined DCI formats. In general, the UE searches for formats 0 and 1A at all times in the USS. Formats 0 and 1A have the same size and are discriminated from each other by a flag in a message. The UE may need to receive an additional format (e.g. format 1, 1B or 2 according to PDSCH transmission mode set by a BS). The UE searches for formats 1A and 1C in the CSS. Furthermore, the UE may be set to search for format 3 or 3A. Formats 3 and 3A have the same size as that of formats 0 and 1A and may be discriminated from each other by scrambling CRC with different (common) identifiers rather than a UE-specific identifier. PDSCH transmission schemes and information content of DCI formats according to transmission mode (TM) are arranged below.

Figure 5:
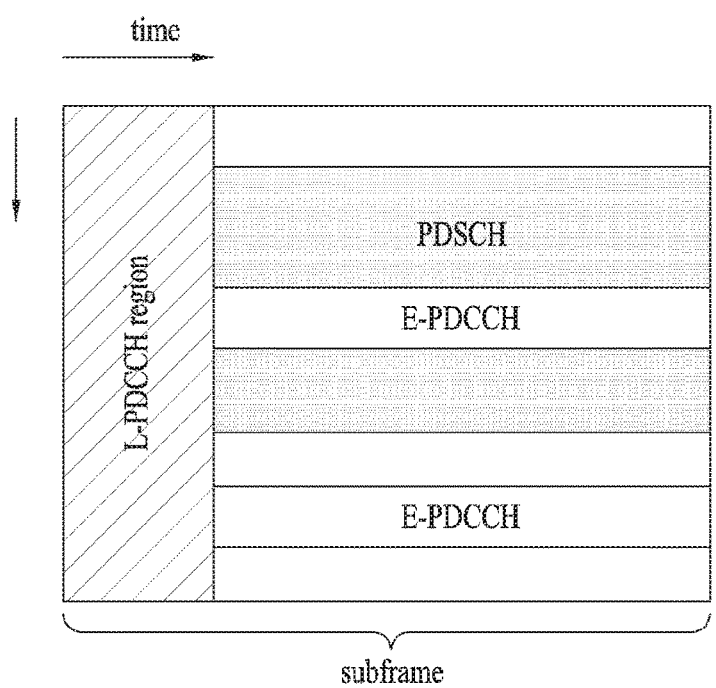
FIG. 5 illustrates an example of Enhanced Physical Downlink Control Channel (EPDCCH).

Transmission Mode (TM)
Transmission mode 1: Transmission from a single base station antenna port
Transmission mode 2: Transmit diversity
Transmission mode 3: Open-loop spatial multiplexing
Transmission mode 4: Closed-loop spatial multiplexing
Transmission mode 5: Multi-user MIMO (Multiple Input Multiple Output)
Transmission mode 6: Closed-loop rank-1 precoding
Transmission mode 7: Single-antenna port (port 5) transmission
Transmission mode 8: Double layer transmission (ports 7 and 8) or single-antenna port (port 7 or 8) transmission
Transmission mode 9: Transmission through up to 8 layers (ports 7 to 14) or single-antenna port (port 7 or 8) transmission
DCI Format
Format 0: Resource grants for PUSCH transmission
Format 1: Resource assignments for single codeword PDSCH transmission (transmission modes 1, 2 and 7)
Format 1A: Compact signaling of resource assignments for single codeword PDSCH (all modes)
Format 1B: Compact resource assignments for PDSCH using rank-1 closed loop precoding (mod 6)
Format 1C: Very compact resource assignments for PDSCH (e.g. paging/broadcast system information)
Format 1D: Compact resource assignments for PDSCH using multi-user MIMO (mode 5)
Format 2: Resource assignments for PDSCH for closed-loop MIMO operation (mode 4)
Format 2A: Resource assignments for PDSCH for open-loop MIMO operation (mode 3)
Format 3/3A: Power control commands for PUCCH and PUSCH with 2-bit/1-bit power adjustments FIG. 5 illustrates an EPDCCH. The EPDCCH is a channel additionally introduced in LTE-A.

Referring to FIG. 5, a PDCCH (for convenience, legacy PDCCH or L-PDCCH) according to legacy LTE may be allocated to a control region (see FIG. 4) of a subframe. In the figure, the L-PDCCH region means a region to which a legacy PDCCH may be allocated. Meanwhile, a PDCCH may be further allocated to the data region (e.g., a resource region for a PDSCH). A PDCCH allocated to the data region is referred to as an E-PDCCH. As shown, control channel resources may be further acquired via the E-PDCCH to mitigate a scheduling restriction due to restricted control channel resources of the L-PDCCH region. Similarly to the L-PDCCH, the E-PDCCH carries DCI. For example, the E-PDCCH may carry downlink scheduling information and uplink scheduling information. For example, the UE may receive the E-PDCCH and receive data/control information via a PDSCH corresponding to the E-PDCCH. In addition, the UE may receive the E-PDCCH and transmit data/control information via a PUSCH corresponding to the E-PDCCH. The E-PDCCH/PDSCH may be allocated starting from a first OFDM symbol of the subframe, according to cell type. In this specification, the PDCCH includes both L-PDCCH and EPDCCH unless otherwise noted.

Figure 6:
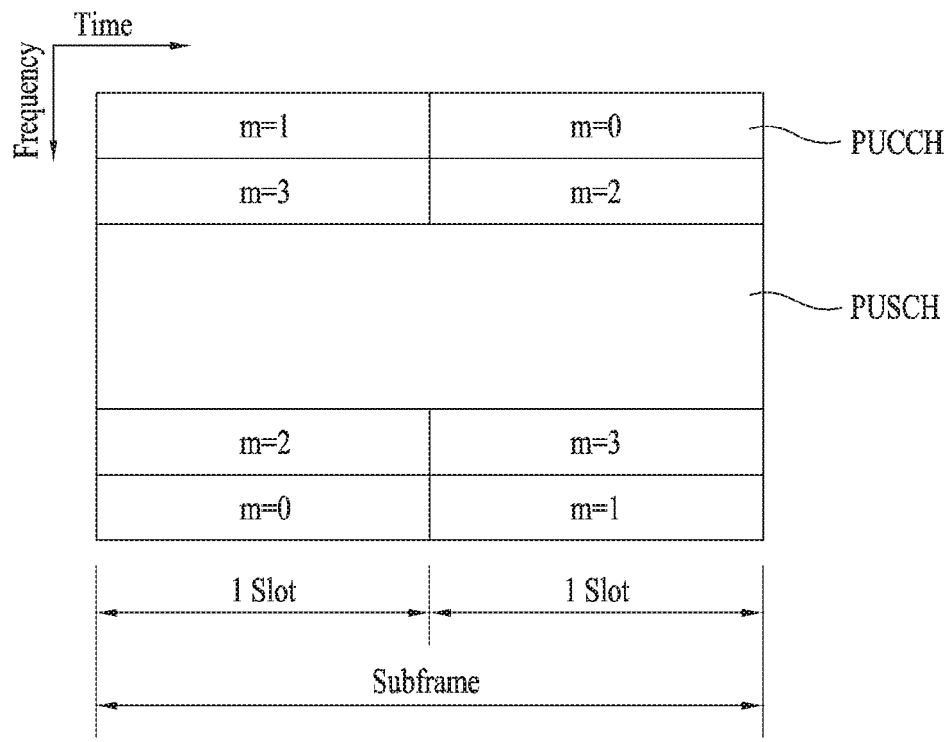
FIG. 6 illustrates the structure of an uplink subframe.

FIG. 6 illustrates an uplink subframe structure.

Referring to FIG. 6, an uplink subframe includes a plurality of (e.g. 2) slots. A slot may include different numbers of SC-FDMA symbols according to CP lengths. For example, a slot may include 7 SC-FDMA symbols in a normal CP case. The uplink subframe is divided into a control region and a data region in the frequency domain. The data region is allocated with a PUSCH and used to carry a data signal such as audio data. The control region is allocated a PUCCH and used to carry control information.

The PUCCH includes an RB pair (e.g. m=0, 1, 2, 3) located at both ends of the data region in the frequency domain and hopped in a slot boundary. Control information includes HARQ ACK/NACK, CQI, PMI, RI, etc.

Figure 7:
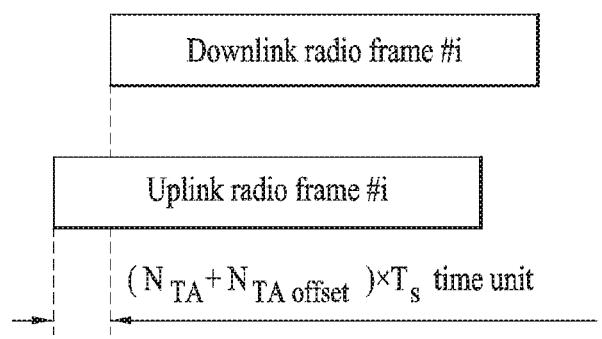
FIG. 7 illustrates uplink-downlink frame timing relation.

FIG. 7 illustrates uplink-downlink frame timing relation.

Referring to FIG. 7, transmission of the uplink radio frame number i starts prior to $(N_{TA}+N_{TAoffset})*T_s$ seconds from the start of the corresponding downlink radio frame. In case of the LTE system, $0 \le N_{TA} \le 20512$, $N_{TAoffset}=0$ in FDD, and $N_{TAoffset}=624$ in TDD. The value $N_{Taoffset}$ is a value in advance recognized by the BS and the UE. If $N_{TA}$ is indicated through a timing advance command during a random access procedure, the UE adjusts transmission timing of UL signal (e.g., PUCCH/PUSCH/SRS) through the above equation. UL transmission timing is set to multiples of $16T_s$. The timing advance command indicates the change of the UL timing based on the current UL timing. The timing advance command $T_A$ within the random access response is a 11-bit timing advance command, and indicates values of 0, 1, 2, . . . , 1282 and a timing adjustment value is given by $N_{TA}=T_A*16$. In other cases, the timing advance command $T_A$ is a 6-bit timing advance command, and indicates values of 0, 1, 2, . . . , 63 and a timing adjustment value is given by $N_{TA,new}=N_{TA,old}+(T_A-31)*16$. The timing advance command received at subframe n is applied from the beginning of subframe n+6. In case of FDD, as shown, transmitting timing of UL subframe n is advanced based on the start time of the DL subframe n. On the contrary, in case of TDD, transmitting timing of UL subframe n is advanced based on the end time of the DL subframe n+1 (not shown).

Figure 8:
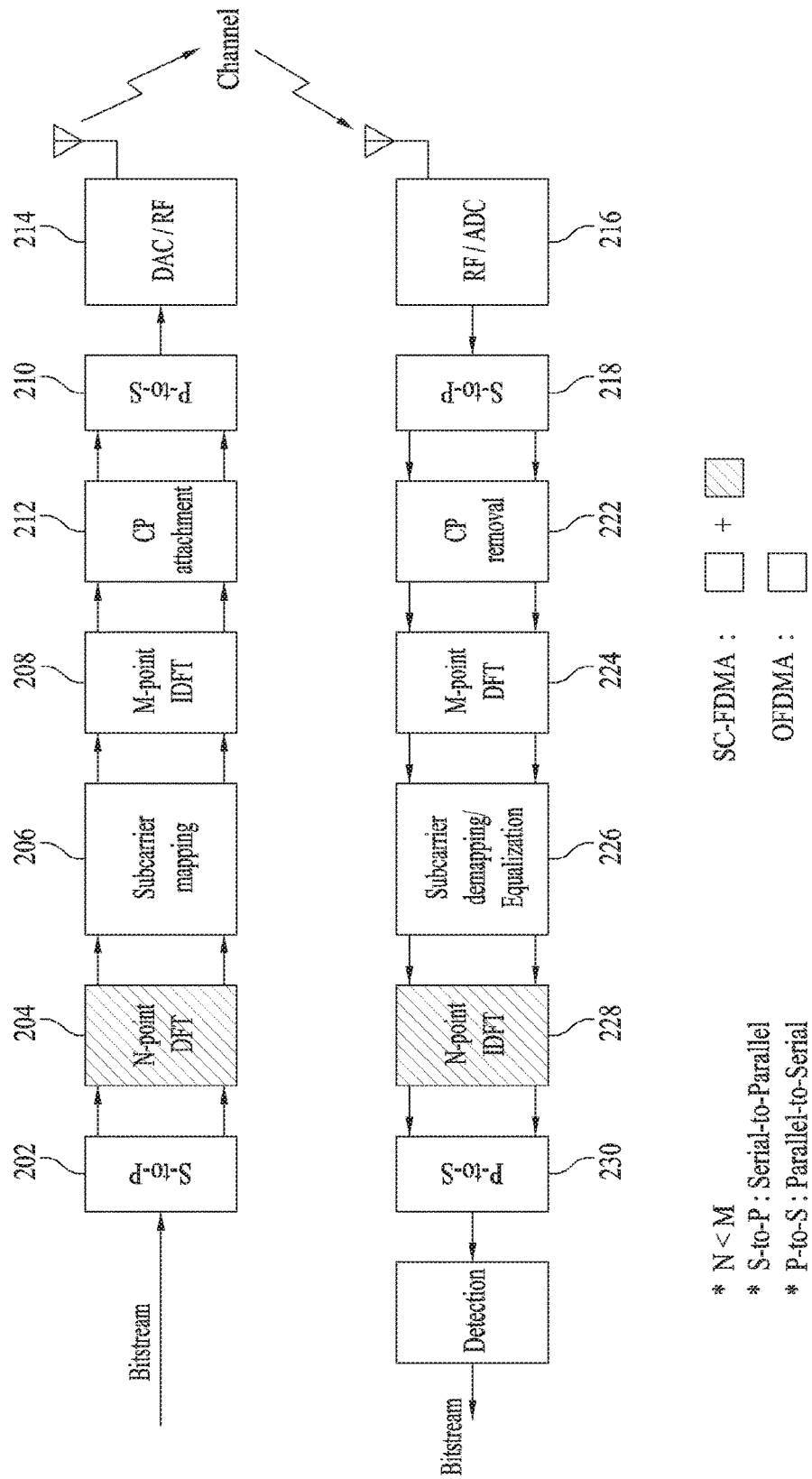
FIG. 8 is a block diagram illustrating a transmitter and a receiver for OFDMA and SC-FDMA.

FIG. 8 is a block diagram illustrating a transmitter and a receiver for OFDMA and SC-FDMA. In uplink (UL), a transmitter may be a part of a User Equipment (UE) and a receiver may be a part of a Base Station (BS). In downlink (DL), the transmitter may be a part of the BS and the receiver may be a part of the UE.

Referring to FIG. 1, an OFDMA transmitter includes a serial-to-parallel converter 202, a subcarrier mapping module 206, an M-point Inverse Discrete Fourier Transform (IDFT) module 208, a Cyclic Prefix (CP) attachment module 212, a parallel-to-serial converter 210, and a Radio Frequency (RF)/Digital-to-Analog Converter (DAC) module 214.

Signal processing in the OFDMA transmitter is as follows. First, a bitstream is modulated into a data symbol sequence. The bitstream may be obtained by performing various types of signal processing including channel encoding, interleaving, and scrambling of a data block delivered from a Medium Access Control (MAC) layer. The bitstream is also referred to as a codeword and is equivalent to a data block received from the MAC layer. The data block received from the MAC layer is referred to as a transport block as well. A modulation scheme may include, but is not limited to, Binary Phase Shift Keying (BPSK), Quadrature Phase Shift Keying (QPSK), and n-Quadrature Amplitude Modulation (n-QAM). Next, a serial data symbol sequence is converted into data symbols N by N in parallel (202). The N data symbols are mapped to N subcarriers allocated among a total of M subcarriers and the (M-N) remaining subcarriers are padded with 0s (206). The data symbol mapped in a frequency domain is converted to a time-domain sequence through M-point IDFT processing (208). Thereafter, in order to reduce Inter-Symbol Interference (ISI) and Inter-Carrier Interference (ICI), an OFDMA symbol is generated by attaching a CP to the time-domain sequence (212). The generated parallel OFDMA symbol is converted into a serial OFDMA symbol (210). The OFDMA symbol is then transmitted to a receiver through digital-to-analog conversion, frequency upconversion, and the like (214). Available subcarriers among the (M-N) remaining subcarriers are allocated to another user. Meanwhile, an OFDMA receiver includes an RF/Analog-to-Digital Converter (ADC) module 216, a serial-to-parallel converter 218, a CP removal module 222, an M-point Discrete Fourier Transform (DFT) module 224, a subcarrier demapping/equalization module 226, a parallel-to-serial converter 230, and a detection module. A signal processing process of the OFDMA receiver has a configuration opposite to that of the OFDMA transmitter.

Meanwhile, compared to the OFDMA transmitter, an SC-FDMA transmitter further includes an N-point DFT module 204 before the subcarrier mapping module 206. The SC-FDMA transmitter spreads a plurality of data in a frequency domain through DFT prior to IDFT processing, thereby considerably decreasing a Peak-to-Average Power Ratio (PAPR) of a transmission signal in comparison with an OFDMA scheme. Compared to the OFDMA receiver, an SC-FDMA receiver further includes an N-point IDFT module 226 after the subcarrier demapping module 226. A signal processing process of the SC-FDMA receiver has configuration opposite to that of the SC-FDMA transmitter.

Figure 9:
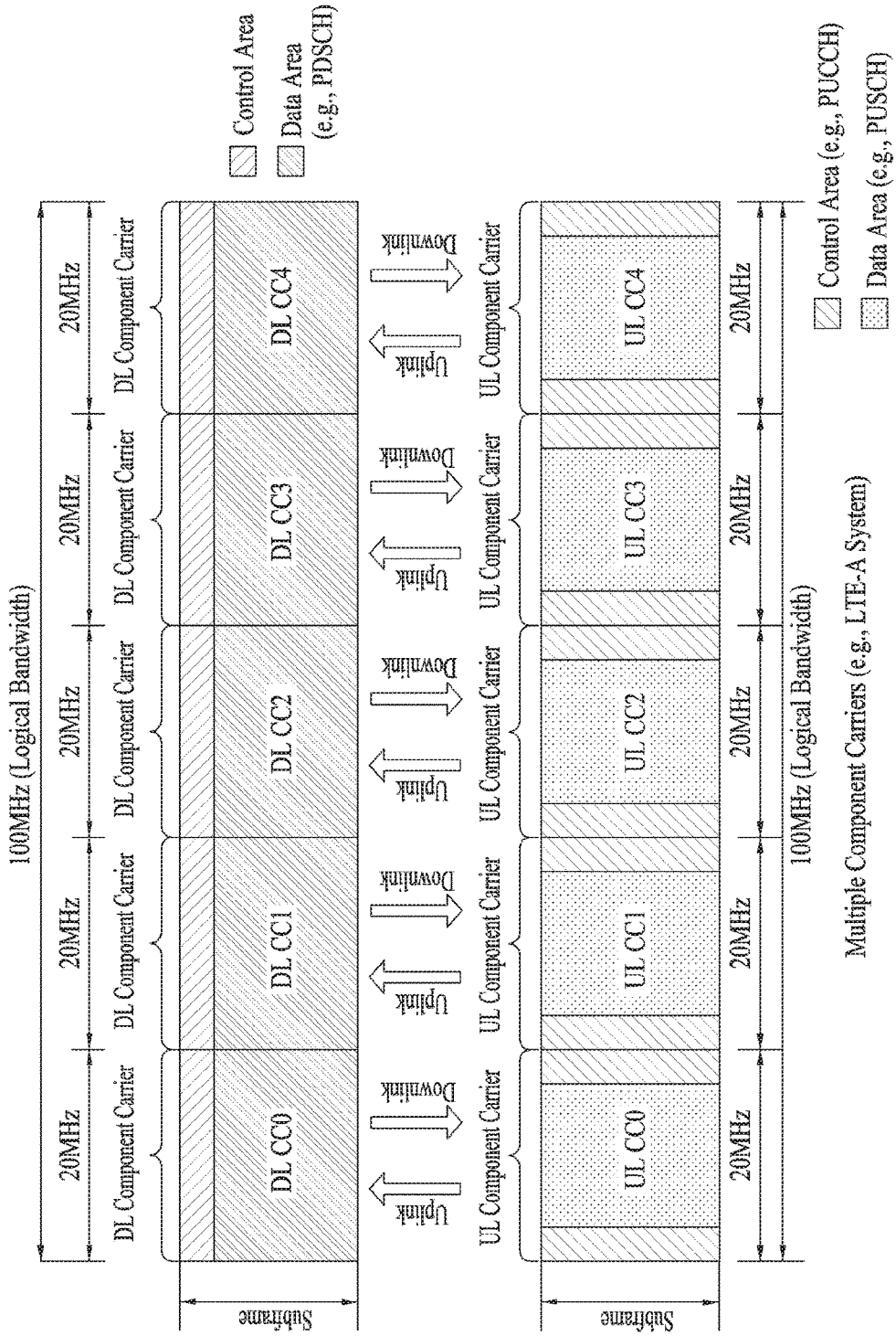
FIG. 9 illustrates a carrier aggregation (CA)-based wireless communication system.

FIG. 9 illustrates carrier aggregation (CA) communication system.

Referring to FIG. 9, a plurality of UL/DL component carriers (CCs) can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. Control information may be transmitted/received only through a specific CC. This specific CC may be referred to as a primary CC and other CCs may be referred to as secondary CCs. For example, when cross-carrier scheduling (or cross-CC scheduling) is applied, a PDCCH for downlink allocation can be transmitted on DL CC #0 and a PDSCH corresponding thereto can be transmitted on DL CC #2. The term "component carrier" may be replaced by other equivalent terms (e.g. "carrier", "cell", etc.).

For cross-CC scheduling, a carrier indicator field (CIF) is used. Presence or absence of the CIF in a PDCCH can be determined by higher layer signaling (e.g. RRC signaling) semi-statically and UE-specifically (or UE group-specifically). The baseline of PDCCH transmission is summarized as follows.

CIF disabled: a PDCCH on a DL CC is used to allocate a PDSCH resource on the same DL CC or a PUSCH resource on a linked UL CC.
No CIF
CIF enabled: a PDCCH on a DL CC can be used to allocate a PDSCH or PUSCH resource on a specific DL/UL CC from among a plurality of aggregated DL/UL CCs using the CIF.
LTE DCI format extended to have CIF
CIF corresponds to a fixed x-bit field (e.g. x=3) (when CIF is set)
CIF position is fixed irrespective of DIC format size (when CIF is set)

When the CIF is present, the BS may allocate a monitoring DL CC (set) to reduce BD complexity of the UE. For PDSCH/PUSCH scheduling, the UE may detect/decode a PDCCH only on the corresponding DL CCs. The BS may transmit the PDCCH only through the monitoring DL CC (set). The monitoring DL CC set may be set UE-specifically, UE-group-specifically or cell-specifically.

Figure 10:
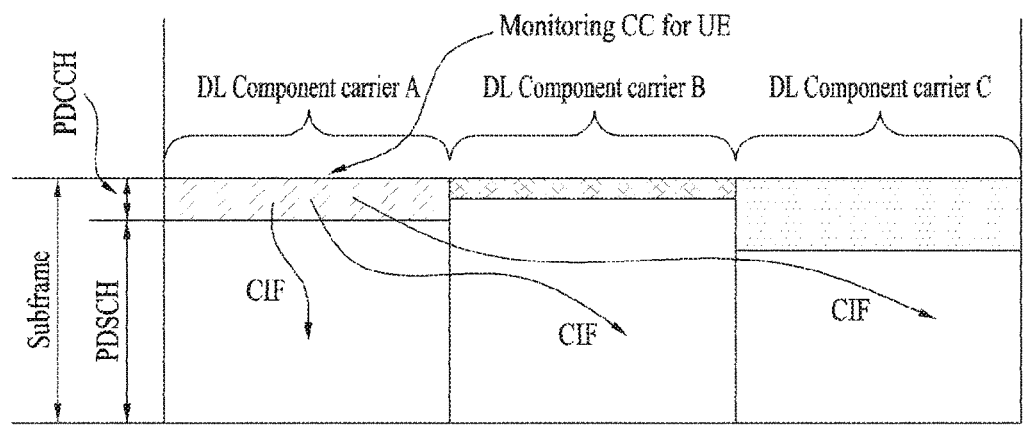
FIG. 10 illustrates a cross-carrier scheduling.

FIG. 10 illustrates scheduling when a plurality of carriers is aggregated. It is assumed that 3 DL CCs are aggregated and DL CC A is set to a PDCCH CC. DL CC A~C may be referred to as a serving CC, serving carrier, serving cell, etc. When the CIF is disabled, each DL CC can transmit only a PDCCH that schedules a PDSCH corresponding to the DL CC without a CIF according to LTE PDCCH rule (non-cross-CC scheduling). When the CIF is enabled through UE-specific (or UE-group-specific or cell-specific) higher layer signaling, a specific CC (e.g. DL CC A) can transmit not only the PDCCH that schedules the PDSCH of DL CC A but also PDCCHs that schedule PDSCHs of other DL CCs using the CIF (cross-scheduling). A PDCCH is not transmitted on DL CC B and DL CC C.

Embodiment: Transceiving Signals in LTE-U

As more and more telecommunication devices require greater communication capacity, efficient utilization of limited frequency bands in future wireless communication systems is increasingly important. Basically, the frequency spectrum is divided into a licensed band and an unlicensed band. The licensed band includes frequency bands reserved for specific uses. For example, the licensed band includes government allocated frequency bands for cellular communication (e.g., LTE frequency bands). The unlicensed band is a frequency band reserved for public use and is also referred to as a license-free band. The unlicensed band may be used by anyone without permission or declaration so long as such use meets radio regulations. The unlicensed band is distributed or designated for use by anyone at a close distance, such as within a specific area or building, in an output range that does not interfere with the communication of other wireless stations, and is widely used for wireless remote control, wireless power transmission, Wi-Fi, and the like.

Cellular communication systems such as LTE systems are also exploring ways to utilize unlicensed bands (e.g., the 2.4 GHz band and the 5 GHz band), used in legacy Wi-Fi systems, for traffic off-loading. Basically, since it is assumed that wireless transmission and reception is performed through contention between communication nodes, it is required that each communication node perform channel sensing (CS) before transmitting a signal and confirm that none of the other communication nodes transmit a signal. This operation is referred to as clear channel assessment (CCA), and an eNB or a UE of the LTE system may also need to perform CCA for signal transmission in an unlicensed band. For simplicity, the unlicensed band used in the LTE-A system is referred to as the LTE-U band. In addition, when an eNB or UE of the LTE system transmits a signal, other communication nodes such as Wi-Fi should also perform CCA in order not to cause interference. For example, in the 801.11ac Wi-Fi standard, the CCA threshold is specified to be −62 dBm for non-Wi-Fi signals and −82 dBm for Wi-Fi signals. Accordingly, the station (STA)/access point (AP) does not perform signal transmission so as not to cause interference when a signal other than Wi-Fi signals are received at a power greater than or equal to −62 dBm. In a Wi-Fi system, the STA or AP may perform CCA and signal transmission if a signal above a CCA threshold is not detected for more than 4 μs.

Figure 11:
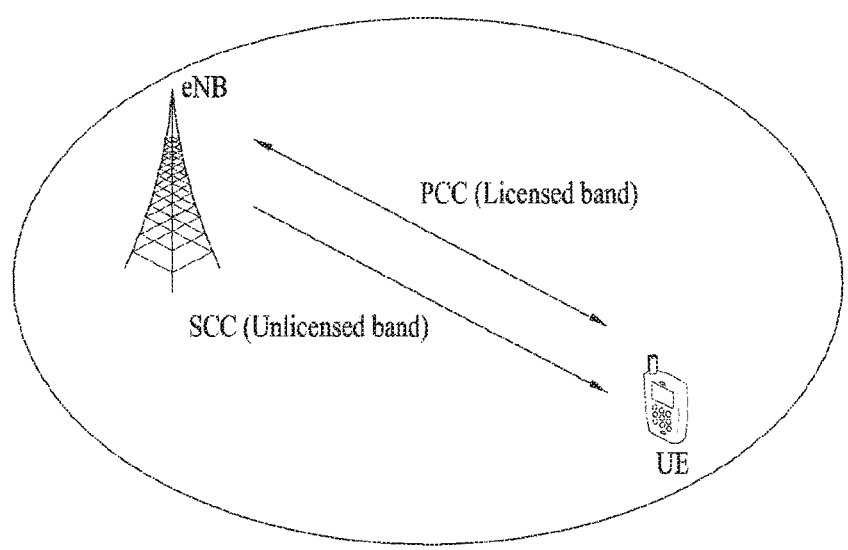
FIG. 11 illustrates carrier aggregation of a licensed band and an unlicensed band.

FIG. 11 illustrates carrier aggregation of a licensed band and an unlicensed band. Referring to FIG. 11, an eNB may transmit a signal to a UE or the UE may transmit a signal to the eNB in a situation of carrier aggregation of the licensed band (hereinafter, LTE-A band) and the unlicensed band (hereinafter, LTE-U band). Here, the center carrier or frequency resource of the license band may be interpreted as a PCC or PCell, and the center carrier or frequency resource of the unlicensed band may be interpreted as an SCC or SCell.

Figure 12:
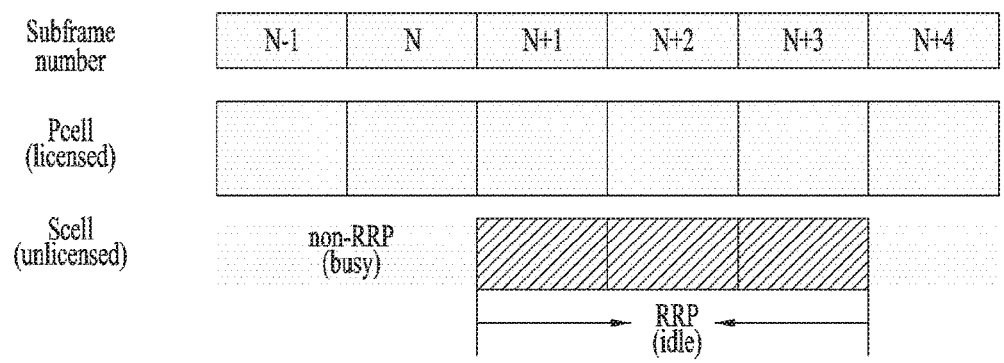
FIGS. 12 and 13 illustrate a method of occupying resources within a licensed band.
Figure 13:
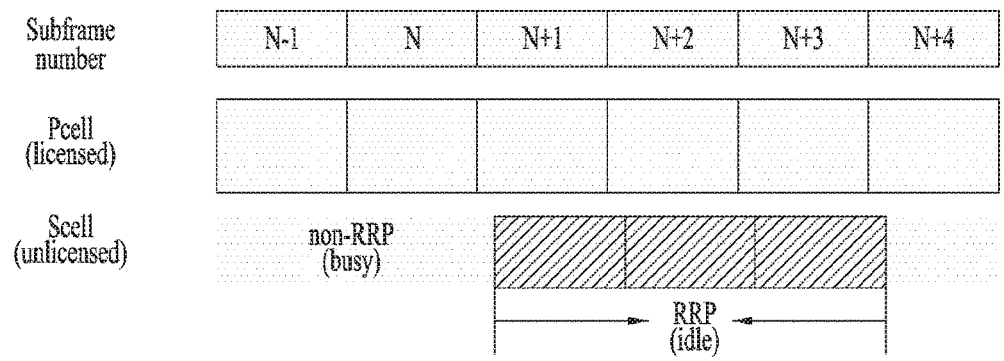

FIGS. 12 and 13 illustrate a method of occupying resources within a licensed band. In order to perform communication between an eNB and a UE in an LTE-U band, the band should be occupied/secured for a specific time period through contention with other communication systems (e.g., Wi-Fi) unrelated to LTE-A. For simplicity, the time period occupied/secured for cellular communication in the LTE-U band is referred to as a reserved resource period (RRP). There are various methods for securing the RRP interval. For example, a specific reservation signal may be transmitted such that other communication system devices such as Wi-Fi can recognize that the corresponding wireless channel is busy. For example, the eNB may continuously transmit an RS and data signal such that a signal having a specific power level or higher is continuously transmitted during the RRP interval. If the eNB has predetermined the RRP interval to occupy in the LTE-U band, the eNB may pre-inform the UE of the RRP interval to allow the UE to maintain the communication transmission/reception link during the indicated RRP interval. The RRP interval information may be transmitted to the UE through another CC (e.g., the LTE-A band) connected through carrier aggregation.

For example, an RRP interval consisting of M consecutive subframes (SF) may be configured. Alternatively, one RRP interval may be configured as a set of non-consecutive SFs (not shown). Here, the eNB may pre-inform the UE through higher layer signaling (e.g., RRC or MAC signaling) or a physical control/data channel of the value of M and the usage of the M SFs (using PCell). The start time of the RRP interval may be set periodically by higher layer signaling (e.g., RRC or MAC signaling). Alternatively, the start time of the RRP interval may be specified through physical layer signaling (e.g., (E)PDCCH) in SF #n or SF # (n−k) when the start time of the RRP interval needs to be set to SF #n. Here, k is a positive integer (e.g., 4).

The RRP may be configured such that the SF boundary and the SF number/index thereof are aligned with the PCell (FIG. 2) (hereinafter, "aligned-RRP"), or configured to support the format in which the SF boundary or the SF number/index is not aligned with the PCell (hereinafter, "floating-RRP") (FIG. 13). In the present invention, the SF boundaries being aligned between cells may mean that the interval between SF boundaries of two different cells is shorter than or equal to a specific time (e.g., CP length or X μs (X≥0)). In addition, in the present invention, a PCell may refer to a cell that is referenced in order to determine the SF (and/or symbol) boundary of a UCell in terms of time (and/or frequency) synchronization.

As another example of operation in the unlicensed band performed in a contention-based random access scheme, the eNB may perform carrier sensing before data transmission/reception. If a current channel status of the SCell is determined as being an idle when the channel status is checked for whether it is busy or idle, the eNB may transmit a scheduling grant (e.g., (E)PDCCH) through the PCell (LTE-A band) or the SCell (LTE-U band), and attempt to perform data transmission/reception on the SCell.

Hereinafter, a method for configuring a resource interval in a cell/carrier in which available resource intervals are reserved/configured aperiodically or non-consecutively, and a corresponding operation of the eNB/UE are proposed. The present invention is applicable to an LTE-U system operating opportunistically in an unlicensed band based on carrier sensing. For simplicity, CA between a PCell operating in the existing licensed band and an SCell operating in the LTE-U scheme is considered. For simplicity, the LTE-U-based cell (e.g., SCell) is defined as a UCell, and a resource interval reserved/configured aperiodically in the UCell is defined as an RRP. The center frequency of the UCell is defined as a (DL/UL) UCC. Cells (e.g., PCell, SCell) operating in the existing licensed band are defined as LCells, and the center frequency of an LCell is defined as a (DL/UL) LCC.

Hereinafter, the transmission period and configuration information of the DCI (hereinafter, referred to as RRP-cfg DCI) signaled for the purpose of RRP configuration in the situation of CA including the RRP-based UCell, and a method for determining an RRP start SF (number/index) in the UCell, and UE operation according to the SF configuration of the RRP and the RRP-cfg DCI transmission will be described. For simplicity, a case in which a UCell is scheduled from the same cell and a case in which a UCell is scheduled from another cell (e.g., PCell) are referred to as self-CC scheduling and cross-CC scheduling, respectively.

For simplicity, it is assumed that one licensed band and one unlicensed band are merged for a UE, and wireless communication is performed through the same. However, the proposed schemes of the present invention may also be applied to a situation wherein a plurality of licensed bands and a plurality of unlicensed bands are used for carrier aggregation. The proposed schemes may also be applied to a case where signal transmission/reception is performed between an eNB and a UE only in an unlicensed band. In addition, the proposed schemes of the present invention may be applied not only to the 3GPP LTE system but also to systems having other characteristics. Hereinafter, the base station is used as a comprehensive term including a remote radio head (RRH), an eNB, a transmission point (TP), a reception point (RP), and a relay.

(0) Definition of RRP on UCell

RRP refers to a resource that is configured non-consecutively/aperiodically depending on the result of carrier sensing. In terms of UE operation and assumptions, the RRP may be defined as follows:

1) a period during which the UE performs (time/frequency) synchronization for a UCell, or a synchronization signal (e.g., PSS, SSS) for the same is assumed to be transmitted (from the eNB);

2) a period during which a UE performs channel state measurement on a UCell or a reference signal (e.g., a cell-specific reference signal (CRS) or a channel state information reference signal (CSI-RS)) is assumed to be transmitted;

3) a period during which the UE performs (DL/UL grant) DCI detection in or for the UCell;

4) a period during which all or some of these operations/assumptions are implemented in the UCell, considering the interval during which the UE performs a (temporary) buffering operation to a signal received in the UCell.

(1) Transmission and Configuration of RRP Configuration DCI

The DCI or information/parameter (e.g., RRP-cfg DCI) transmitted for RRP configuration may be transmitted in the PDCCH format using CSS resources on the PCell or may be transmitted through a specific signal (e.g., a radio channel reservation signal or preamble signal) configured on the UCell. The following two RRP-cfg DCI detection schemes may be considered depending on the eNB's resource use frequency and/or scheduling plan for the UCell (from the UE perspective).

Alt D1: Performing RRP-cfg DCI detection in all DL SFs

The UE may perform a detection operation for RRP-cfg DCI in all DL SFs of the PCell. One RRP-cfg DCI may be configured as a single PDCCH transmitted through one DL SF, or a plurality of PDCCHs repeatedly transmitted through R (>1) DL SFs.

Alt D2: Performing RRP-cfg DCI detection every N SFs

The UE may perform a detection of RRP-cfg DCI for one or M (>1) SFs every N (>1) SFs. One RRP-cfg DCI may be transmitted (repeated) through one or R (>1) SFs. Here, M may be set to the same value as R or a multiple of R, and the interval of R SFs configured for one RRP-cfg DCI may be allocated only in one interval of M SFs in which RRP-cfg DCI detection is performed (i.e., not configured over a plurality of intervals of M SFs).

Meanwhile, one RRP-cfg DCI may include RRP interval configuration information for a plurality of UCells. Specifically, each of a plurality of fields (for simplicity, R-field) in the DCI may signal RRP configuration information for an individual/independent UCell. In this case, the RRP-cfg DCI may be transmitted in the form of a UE-common RNTI-based PDCCH. That is, the RRP configuration information for a specific UCell may be signaled through a combination of a specific RNTI and an R-field. For a UCell for which an RRP interval is not configured, information corresponding to "no RRP configuration" may be signaled through a corresponding R-field.

Alternatively, one RRP-cfg DCI may include RRP interval configuration information (on a specific UCell) for a plurality of UEs. Specifically, each of a plurality of fields (for simplicity, R-field) may signal RRP configuration information about one individual/independent UE. In this case, the RRP-cfg DCI may be transmitted in the form of a UE-common RNTI-based PDCCH. That is, the RRP configuration information for a specific UCell may be signaled through a combination of a specific RNTI and an R-field. For a UE for which an RRP interval is not configured, information corresponding to "no RRP configuration" may be signaled through the corresponding R-field for a UE.

Meanwhile, when RRP is defined as a valid CSI (reference/measurement) resource interval on the UCell, a UE configured with a specific transmission mode (TM) may consider/assume that only RS transmission corresponding to the specific TM is performed in the interval set to the RRP. For example, if the UE is set to TM 2 or 4, it may operate assuming/considering only CRS transmission. If the UE is set to TM 9 or 10, it may operate assuming/considering only the CSI-RS and/or CSI-IM (interference measurement) transmission.

The information signaled through the RRP-cfg DCI may include the following information depending on the RRP-cfg DCI transmission/detection SF configuration (e.g., Alt D1 or Alt D2) and the SF resource configuration on the UCell (e.g., aligned-RRP or floating-RRP).

RRP interval length and SF usage

RRP-cfg DCI may be signaled for purposes of announcing the total time of the RRP interval (e.g., the total number of SFs in the RRP interval) and the usage of SFs that constitute the RRP (e.g., whether the SFs are DL SFs or UL SFs). In order to prevent the RRP interval from being determined to be idle through carrier sensing by other systems, the SFs within one RRP interval may all be configured as DL SFs or UL SFs (without DL/UL switching interval). Alternatively, in the case of DL to UL switching, a guard period may exist (as in the TDD special SF) and the aforementioned problem may be raised. On the other hand, in the case of UL to DL switching, since the eNB may perform DL signal transmission immediately after receiving a UL signal from the UE, the SFs within one RRP interval may be arranged in such a manner that consecutive UL SFs are arranged first and then consecutive DL SFs are arranged. For example, when one RRP interval consists of 4 SFs, the SFs in the RRP may be arranged in a manner of UL/DL/DL/DL, UL/UL/DL/DL, or UL/UL/UL/DL. For simplicity, the proposed DL/UL combination is referred to as "UL-DL mixed RRP". On the basis of this, the SFs in an RRP interval may be configured as 1) either (i) all DL SFs or (ii) the proposed combination of DL SFs/UL SFs, 2) (i) all UL SFs or (ii) the proposed combination of DL SFs/UL SFs, or 3) (i) all DL SFs or all UL SFs or (ii) the proposed combination of DL SFs/UL SFs.

Alternatively, only the usage of the RRP configuration SF may be indicated through the RRP-cfg DCI while the length of the RRP interval is preconfigured through the higher layer (e.g. RRC) signaling, or only the length of the RRP interval may be indicated through the RRP-cfg DCI while the usage of the RRP configuration SF is preconfigured through the higher layer signaling.

Only the cross-CC scheduling may be allowed for the UCell when all the SFs in the RRP interval are configured as UL SFs or this configuration is included. In the case of HARQ timing (e.g., UL grant/PUSCH/PHICH transmission) for the UL HARQ process/operation accompanying UL data transmission/scheduling in a UCell, the following UL HARQ timing applied to the FDD SCell may be applied to the UCell (depending on whether the PCell is in FDD or TDD) under assumption that the UCell is considered to be identical to an FDD SCell. In terms of UL HARQ timing, the PCell may mean a cell configured to perform (cross-CC) scheduling on the UCell.

In case of FDD PCell: The UL grant scheduling PUSCH transmission in SF #n is transmitted/received through SF #(n−4), and a PHICH corresponding to the PUSCH transmission in SF #n is transmitted/received through SF #(n+4).

In case of TDD PCell: The UL grant scheduling PUSCH transmission in SF #n is transmitted/received through SF #(n−4), and a PHICH corresponding to the PUSCH transmission in SF #n is transmitted/received through SF #(n+6) (or UL HARQ timing defined in the UL/DL configuration of the PCell is applied)

Even in the case of the UL-DL mixed RRP, there may exist the UL-to-DL switching period (i.e., an RX-to-TX switching gap in the eNB). Accordingly, in order to perform stable DL transmission/scheduling during the corresponding RRP, it may be necessary (for the LTE-U system) to continuously occupy the radio channel on the UCell during the RX-to-TX gap. To this end, a UE transmitting or configured/scheduled to transmit a UL channel/signal (e.g., PUSCH or SRS) through the last UL SF of the UL-DL mixed RRP (immediately before the first DL SF) may be designated/instructed to transmit a specific signal (hereinafter, referred to as a post-reservation signal) having a short duration from the end of the UL SF to a specific point in time (without carrier sensing). The post-reservation signal may be configured in the form of the cyclic prefix (part thereof) or a cyclic postfix. The cyclic postfix is configured by a part copying the first part of the IFFT (IDFT of FIG. 8)—processed time-domain signal. The transmission related information (e.g., timing, duration) about the post-reservation signal may be configured by the eNB. In addition, even if UL channel/signal transmission is not configured/scheduled in a given UL-DL mixed RRP (or the last UL SF in the corresponding RRP), the UE may be designated/instructed to perform only transmission of a post-reservation signal (from the end of the last UL SF without carrier sensing).

If a specific UE (e.g., a UE for which a TA value applied to UL transmission is set to be very small) transmits the post reservation signal until after the last UL SF within the UL-DL mixed RRP, the UE may not properly receive the first OFDMA symbol in the first DL SF due to the UL-to-DL switching operation, namely, the TX-to-RX switching operation (a gap accompanying the same). In consideration of this, 1) only UEs whose TA value is above a specific threshold value are allowed to perform transmission of a corresponding post-reservation signal, 2) whether or not to perform post-reservation signal transmission may be UE-specifically announced through RRC or UL grant, or 3) a UE experiencing such a problem may be allowed to perform an operation for excluding the first DL OFDMA symbol from the received signal (e.g., puncturing the first DL OFDMA symbol). In addition, in consideration of the above-described problem, the UE-common signal/resource (e.g., synchronization/reference signal and/or measurement signal/resource) transmitted through the first (or all) DL SFs in the UL-DL mixed RRP may consist only of OFDMA symbols that follow the first symbol. Otherwise, a UE-common signal/resource (e.g., a synchronization/reference signal and/or a measurement signal/resource, etc.) may also be present in the first OFDMA symbol. The proposed method is not limited to the UL-DL mixed RRP but may be applied to any RRP including UL-to-DL switching. In this case, the last UL SF and the first DL SF in the UL-DL mixed RRP may be replaced with/considered as the UL SF located immediately before the UL SF and the DL SF located immediately after the UL SF, respectively.

The Number of Remaining SFs in RRP Interval

This information may be signaled to indicate the number of remaining SFs (or a parameter from which the number may be inferred, for example, the position of the SF corresponding to the time point within the RRP interval) in the remaining RRP interval from the time when the RRP-cfg DCI is detected (or the time corresponding to the detection time plus a specific SF offset). This information may be useful in a situation where RRP-cfg DCI transmission/detection is set to be performed for all DL SFs as in the case of Alt D1).

RRP Start SF Number/Index

This information may be signaled to indicate an SF number/index of the start SF of the RRP interval (or a parameter from which the SF number/index may be inferred). This information may be useful in a situation in which the SF boundary (or SF number/index) of the UCell is not aligned with the PCell (e.g., the floating-RRP) or in a situation where the UE directly detects the RRP start point (a specific preamble, synchronization signal, reference signal, or the like for identifying the RRP start point).

Start Symbol Position Information about UCell SF

This information may be signaled to indicate the interval between the start OFDMA symbols of the PCell SF and the UCell SF having the same SF number/index or information for inferring the same, and/or the positional relationship between the start OFDMA symbols of the PCell SF and the UCell SF having the same SF number/index. For example, this information may indicate how far the start OFDMA symbols of the PCell SF and the UCell SF having the same SF number/index are spaced from each other (e.g., the number of OFDMA symbols). In addition, this information may indicate whether the start OFDMA symbol of the UCell SF is located earlier or later than the start OFDMA symbol of the PCell SF having the same SF number/index). This information may be useful in a situation in which the SF boundary (or the SF number/index) of the UCell is not aligned with that of the PCell (e.g., a situation of the floating-RRP).

RRP Index/Number

This information may be signaled to indicate the index (or number) for the RRP (relative to, for example, the RRP). For example, the RRP indexes may be determined in a manner that RRP index 0 is determined for the first RRP configured/set in the UCell, RRP index 1 is determined for the second RRP configured/set in the UCell, and RRP index 2 is determined for the third RRP configured/set in the UCell in time order.

When RRP indexes are given, the UL channel/signal transmission related information and/or the DL channel/signal transmission related information in the UCell may be configured/defined based on the RRP index and/or the SF index/number in the RRP. Here, the UL channel/signal transmission related information includes, for example, PRACH preamble transmission timing, SRS transmission timing/period, PUSCH retransmission timing gap, and the like. The DL channel/signal transmission related information may include, for example, a synchronization signal (e.g., PSS/SSS) transmission timing/period, a measurement/tracking RS (e.g., CRS, Discovery RS) transmission timing/period, CSI-RS transmission timing/period, interference measurement resource (i.e. CSI-IM or zero-power CSI-RS) configuration timing/period, and the like.

(2) Determination of RRP Start SF in UCell

The following two schemes may be considered as methods for determining the start point (e.g., SF) of the RRP interval that is aperiodically configured on the UCell (from the perspective of the UE).

Alt S1: The time when a specific signal is detected on the UCell is determined as the RRP start SF.

When a specific signal (hereinafter referred to as a UCell preamble) is configured to be transmitted only through a start portion (e.g., SF) within an RRP interval, the UE may directly perform a detection operation on the UCell preamble. The UE may determine the time when the UCell preamble is detected as the start point (e.g., SF) of the RRP interval. The UCell preamble may be in the form of, for example, a preamble, a synchronization signal (e.g., PSS and/or SSS), a reference signal (e.g., CRS), or the like.

Alt S2: The RRP start SF is implicitly determined from a specific SF time of the PCell.

A specific (SF) time on the PCell, for example, an SF in which the RRP-cfg DCI is detected (or a time obtained by adding a specific SF offset to the specific time) may be determined as the start point (e.g. SF) of the RRP interval. In this case, the UE may operate assuming/considering that (at least) the SF boundary of the UCell is aligned with that of the PCell. This scheme may be useful in a situation where there is no separate signal configuration for indicating the starting point within the RRP interval).

When the start point of the RRP interval and the SF boundary of UCell are determined based on the above scheme or another scheme, the following methods may be used to determine the SF number/index.

The SF number/index is determined through detection of the attribute of a UCell preamble signal.

The mapping relationship between the attribute of the UCell preamble signal and the SF number/index may be preset such that the attribute of the UCell preamble signal may be classified according to the SF number/index. Accordingly, the UE may determine the SF number/index of the SF including the UCell preamble signal in the RRP by detecting the signal attribute of the UCell preamble. For the remaining SFs in the RRP, the corresponding SF number/index may be determined in consideration of the relative time relationship with the corresponding preamble SF. The attributes of the UCell preamble signal include, for example, a sequence (pattern or type) constituting the preamble signal, and a resource (e.g., OFDMA/SC-FDMA symbol or RE) on which the preamble signal is transmitted.

For example, it may be assumed that the preamble sequence (pattern) #0 is mapped to the SF (number/index) #0 and the sequence #1 corresponds to the SF #1, namely, when sequence #n is mapped to SF #n. It is assumed that One RRP interval (length) is composed of 3 SFs, and the UCell preamble is configured/transmitted in the RRP start SF. In this case, when sequence #5 is detected through the UCell preamble signal, the SF numbers/indexes corresponding to the three SFs constituting the RRP may be determined as SFs #5, #6, and #7 in time order.

The SF number/index is determined according to the SF overlap portion between UCell and PCell.

The SF (number/index) corresponding to a PCell SF more overlapping the interval of the UCell SF may be determined as the SF number/index of the corresponding UCell SF. Equivalently, the SF number/index corresponding to a UCell SF may be determined depending on the slot in the overlapping PCell SF where the start point of the UCell SF is located. For example, the SF number/index of the UCell SF may be determined as SF #n when the start point of the UCell SF is located in the first slot of the overlapping PCell SF (e.g., SF #n) and as SF #(n+1) when the start point of the UCell SF is located in the second slot of the overlapping PCell SF.

Alternatively, the SF number/index of the corresponding UCell SF may be determined to be Opt 1) an SF number/index corresponding to the PCell SF overlapping at the end of the UCell SF or Opt 2) an SF number/index corresponding to the PCell SF overlapping at the start point of the UCell SF. In a situation of cross-CC scheduling, in consideration of the decoding latency for the PDSCH scheduled in the UCell, the processing time between PDSCH reception and HARQ-ACK transmission, and the processing time between the PUSCH transmitted through the UCell and UL grant DCI transmission, and the like, the Opt 1 scheme may be applied if all SFs in the RRP interval are configured as DL SFs and the Opt 2 scheme may be applied if all SFs in the RRP interval are configured as UL SFs.

In the case of Opt 1, the SF number/index corresponding to the PCell SF more overlapping the corresponding UCell SF, between 1) the PCell SF overlapping with the end point of the UCell SF and 2) the PCell SF overlapping with the previous/following point spaced by a specific time offset (e.g. X us) from the end point of the UCell SF, may be determined as the SF number/index of the corresponding UCell SF. Similarly, in the case of Opt 2, the SF number/index corresponding to the PCell SF more overlapping the corresponding UCell SF, between 1) the PCell SF overlapping the start point of the UCell SF and 2) the PCell SF overlapping the following/previous point spaced by a specific time offset (e.g. X usec) from the start point of the UCell SF, may be determined as the SF number/index of the corresponding UCell SF.

(3) UE Operation According to RRP Configuration/Setting

There are two cases in which the transmission structure of the RRP-cfg DCI (e.g. Alt D1 or D2) and the RRP start SF determining method (e.g. Alt S1 or S2) are combined. In each case, the following UE operations may be considered according to the result of RRP-cfg DCI detection.

Case 1: Alt D1 or D2+Alt S1

The UE may Opt 1) attempt to detect the UCell preamble from k (k=0, . . . ) SFs after the time at which RRP-cfg DCI detection succeeds (particularly, in case of Alt D1) or the time at which the UE performs the RRP-cfg DCI detection operation, or Opt 2) always perform the UCell preamble detection operation regardless of success/failure of RRP-cfg DCI detection or the detection cycle.

If the UE fails to detect the RRP-cfg DCI but succeeds in detecting the UCell preamble, the UE may operate on the assumption of only the predetermined minimum RRP interval. This scheme may be useful in a situation in which the UE attempts UCell preamble detection based on the time of RRP-cfg DCI detection operation (Opt 1) or at all times (Opt 2) regardless of whether RRP-cfg DCI detection is successful or not. On the contrary, if the UE succeeds in detecting RRP-cfg DCI but fails to detect the UCell preamble, the UE may rely only on the detection of the DL/UL grant DCI for scheduling the data transmission in the UCell to configure the SF resources on the UCell, and perform DL/UL transmission/reception only through the configured SF resources. This scheme may be useful in a situation in which the UE operates with the SF boundaries of the UCell and the PCell aligned.

Case 2: Alt D1 or D2+Alt S2

The UE may operate on the assumption that the RRP interval starts on the UCell after k (k=1, . . . ) SFs from the RRP-cfg DCI detection time. At this time, if the UE fails to detect RRP-cfg DCI, the UE may rely only on the detection of the DL/UL grant DCI for scheduling data transmission in the UCell to configure the SF resources on the UCell, and perform DL/UL transmission/reception only through the configured SF resources.

(4) UE Operation According to Floating-RRP Configuration

The RRP on the UCell may include a DL SF and be configured in the form of floating-RRP. In this case, there is a possibility that the time interval between the completion time of decoding of PDSCH transmitted through the UCell and the corresponding HARQ-ACK feedback transmission time in the PCell is much shorter than the existing time interval, depending on the positional relationship between the UCell SF and the PCell SF having the same SF number/index (in particular, in a case where the PCell SF is positioned ahead of the UCell SF by more than a certain interval). In such a situation, in order to make it possible to process a given PDSCH signal and HARQ-ACK signal within the shortened time interval, the processing speed/capability of the UE may need to be improved correspondingly, which may greatly increase UE complexity compared to conventional cases.

Accordingly, the UE may determine/generate and transmit "NACK" as the HARQ-ACK response regardless of the result of PDSCH decoding, or transmit no HARQ-ACK signal under situations/conditions given below. Alternatively, under the same situation/condition, the UE may feed back the decoding result (e.g., ACK or NACK) for the remaining OFDMA symbol(s) of the entire PDSCH reception signal except for some of the last OFDMA symbol(s) of the signal (e.g., puncturing the corresponding OFDMA symbol(s)) as a HARQ-ACK response for the corresponding PDSCH reception under the same situations/conditions:

the time interval between (i) the UCell SF and (ii) the PCell SF having the same SF number/index is greater than a specific value (particularly, the PCell SF precedes the UCell SF);

the time interval between (i) the time of PDSCH signal reception (completion) (in the UCell) and (ii) the corresponding time of (start of) transmission of an HARQ-ACK signal (in the PCell) is shorter than a specific value, or the time interval between (i) the time of completion of PDSCH decoding and (ii) the time of generation of the corresponding HARQ-ACK signal is shorter than a specific value (i.e., PDSCH decoding is not completed until the time when the HARQ-ACK response is to be determined).

Similarly, in the following situations/conditions, the UE may omit/discard PUSCH transmission corresponding to the DCI or exclude the first few SC-FDMA symbol(s) of the entire (scheduled) PUSCH signal (e.g., performing puncturing on the corresponding symbol(s)) and transmit the remaining SC-FDMA symbol(s):

the time interval between (i) the UCell SF and (ii) the PCell SF having the same SF number/index is longer than a specific value (particularly, the UCell SF is located before the PCell SF), the time interval between (i) the time of UL grant DCI reception (completion) (in the PCell) and the corresponding time of (start of) PUSCH signal transmission (in the UCell) is shorter than a specific threshold, or the time interval between (i) the time of completion of UL grant DCI decoding and (ii) the corresponding time of PUSCH signal generation is shorter than a specific threshold value (i.e., the UL grant DCI decoding is not completed until PUSCH signal generation is to be started).

(5) DL Power Allocation Method for RRP

In the case of the legacy LTE system, allocation of the DL signal transmit power in the existing DL SF may be determined by the following parameters.

P_R: CRS RE transmit power (linear average in [W])

P_A: A ratio of PDSCH RE transmit power in a transmission symbol in which the CRS is not transmitted to CRS RE transmit power (in [dB])

P_B: A ratio of PDSCH RE transmit power in a transmission symbol in which CRS is transmitted to CRS RE transmit power (in [dB])

P_C: A ratio of PDSCH RE transmit power (in a transmission symbol in which CRS is not transmitted) to CSI-RS RE transmit power (in [dB])

Specifically, the eNB determines the DL transmit power for each RE. The UE assumes that the CRS RS EPRE (Energy Per Resource Element) (i.e., P_R) is constant over the entire DL BW and is constant over all subframes until new CRS power information is received. The CRS RS EPRE may be inferred based on a parameter (e.g., referenceSignalPower) provided by higher layer (e.g., RRC) signaling. The ratio of the PDSCH EPRE to the CRS RS EPRE (i.e., PDSCH EPRE/CRS RS EPRE) is set differently considering the CRS distribution. For example, one of P_A and P_B may be inferred and determined based on a parameter provided by higher layer (e.g., RRC) signaling, and the other one of P_A and P_B may be determined using the ratios therebetween. For example, P_A/P_B may have various values such as 1, 4/5, 3/5, and 2/5 depending on CRS distribution (e.g., the number of antenna ports).

If the RRP interval configured on the UCell includes CRS transmission, allocation of the DL signal transmit power in the UCell RRP interval may be performed based on the scheme above. Here, if path-loss measurement via CRS receive power is not required in the UCell, definition/setting of P_R in the UCell may be omitted.

If the RRP interval configured on the UCell does not include CRS transmission or uses only the CSI-RS as a UE-common RS, allocation of DL signal transmit power in the UCell RRP interval may be performed by replacing the parameters of the conventional scheme with the parameters of Method 1/2 below. In this case, definition/configuration of P_R in the UCell may be omitted if path loss measurement through the CSI-RS receive power is not required in the UCell.

Method 1
P_R: CSI-RS RE transmit power
P_A: PDSCH RE transmit power in a symbol in which CSI-RS is not transmitted relative to CSI-RS RE transmit power
P_B: PDSCH RE transmit power in a symbol in which CSI-RS is transmitted relative to CSI-RS RE transmit power Method 2
P_R: CSI-RS RE transmit power
P_A: PDSCH RE transmit power (in any symbol) relative to CSI-RS RE transmit power For the RRP configured on the UCell, considering that the channel environment and the interference influence may vary over time due to the nature of the unlicensed band (due to attempts to transmit signals from other systems (e.g. Wi-Fi)), the values of P_R, P_A, P_B, and P_C parameters in Method 0/1/2 may be independently configured in RRP (or RRP group) units or specific time duration units. These power allocation parameters may be signaled in a UE-common manner through a PDCCH configured/transmitted on the CSS of the PCell or a preamble signal configured/transmitted on the UCell, or may be UE-specifically signaled through a DL grant for scheduling data transmission in the Ucell or a UL grant (for requesting/instructing aperiodic CSI reporting). Further, a plurality of possible combinations of the power allocation parameters (e.g., P_R, P_A, P_B, and P_C) may be preset via a higher layer signal (e.g., RRC signaling), and a parameter combination to be applied to Ucell power allocation may be dynamically indicated via the specific signal (e.g., the PDCCH, preamble or DL/UL grant).

Meanwhile, the conventional normal SCell is UE-specifically configured, but the SCell (i.e., UCell) operating in the unlicensed band may be configured in a UE-common manner. Therefore, it is also possible to transmit the entire system information about the UCell or a specific part thereof through a specific broadcast signal (e.g., SIB (System Information Block)) in the PCell.

The proposed methods of the present invention may not be limitedly applied to cells operating based on an aperiodic RRP configuration such as LTE-U, and may be applied to a general cell operating based on the transmission resource configuration as in legacy LTE in a similar manner.

Figure 14:
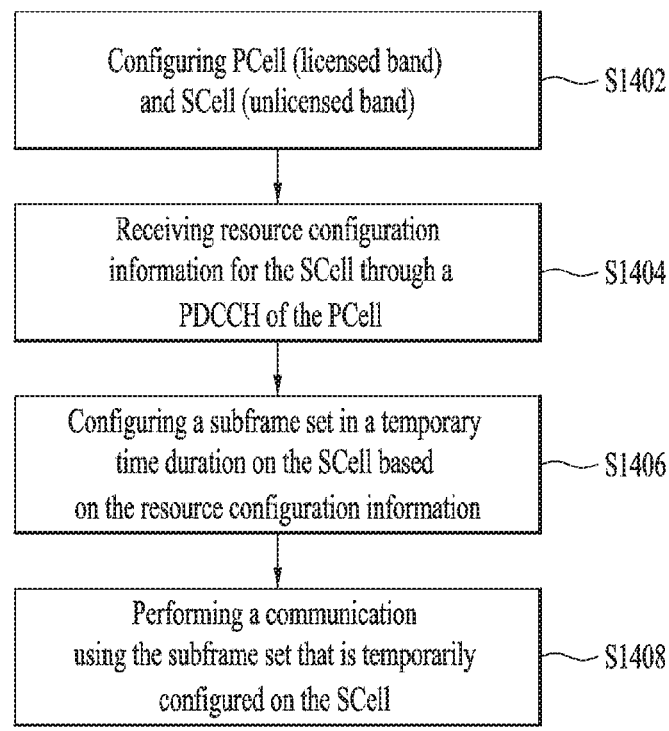
FIG. 14 illustrates a communication performing method according to an embodiment of the present invention.

FIG. 14 illustrates a communication method according to an embodiment of the present invention.

Referring to FIG. 14, a UE may configure a PCell of a licensed band and an SCell of an unlicensed band for an eNB (S1402). Then, the UE may receive resource configuration information (e.g., RRP-cfg DCI) about the SCell (i.e., UCell) through a PDCCH of the PCell (i.e., LCell) (S1404). Thereafter, the UE may configure a subframe set (e.g., RRP) within a temporary time period of the SCell (i.e., UCell) based on resource configuration information (e.g., RRP-cfg DCI) (S1406). The UE may then perform communication with the eNB using the subframe set (e.g., RRP) temporarily configured on the SCell (i.e., UCell). Here, for details of the RRP-cfg DCI and the RRP and the operations of the UE/eNB (e.g., HARQ feedback operation, power control operation, etc.), see the descriptions given above.

Figure 15:
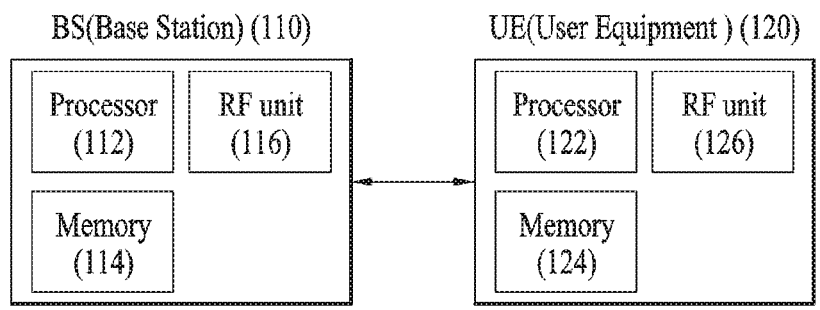
FIG. 15 illustrates a base station and a user equipment applicable to an embodiment of the present invention.

FIG. 15 illustrates a BS and a UE of a wireless communication system, which are applicable to embodiments of the present invention.

Referring to FIG. 15, the wireless communication system includes a BS 110 and a UE 120. When the wireless communication system includes a relay, the BS or UE may be replaced by the relay.

The BS 110 includes a processor 112, a memory 114 and a radio frequency (RF) unit 116. The processor 112 may be configured to implement the procedures and/or methods proposed by the present invention. The memory 114 is connected to the processor 112 and stores information related to operations of the processor 112. The RF unit 116 is connected to the processor 112 and transmits and/or receives an RF signal. The UE 120 includes a processor 122, a memory 124 and an RF unit 126. The processor 122 may be configured to implement the procedures and/or methods proposed by the present invention. The memory 124 is connected to the processor 122 and stores information related to operations of the processor 122. The RF unit 126 is connected to the processor 122 and transmits and/or receives an RF signal.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The embodiments of the present invention mentioned in the foregoing description may be applicable to various kinds of mobile communication systems.

The invention claimed is:

1. A method for performing communication by a User Equipment (UE) in a cellular communication system, the method comprising:
receiving resource configuration information about an unlicensed band cell through a Physical Downlink Control Channel (PDCCH);
receiving reference signals within a contiguous time period of the unlicensed band cell; and
performing a measurement of the reference signals within the contiguous time period of the unlicensed band cell,
wherein, for the measurement of the reference signals, power per Resource Element (RE) of the reference signals is constant within the contiguous time period of the unlicensed band cell,
wherein the contiguous time period of the unlicensed band cell comprises a plurality of contiguous Orthogonal Frequency Division Multiplexing (OFDM) symbols, and
wherein the contiguous time period of the unlicensed band cell is configured based on the resource configuration information.

2. The method according to claim 1, wherein the contiguous time period of the unlicensed band cell is non-contiguous with another contiguous time period of the unlicensed band cell, and the power per RE of the reference signals of each contiguous time period of the unlicensed band cell is independently configured.

3. The method according to claim 1, wherein the power per RE of the reference signals includes Cell-specific reference signal (CRS) Energy Per Resource Element (EPRE) or Channel State Information reference signal (CSI-RS) Energy Per Resource Element (EPRE).

4. The method according to claim 1, wherein a length of the contiguous time period of the unlicensed band cell is pre-indicated through an Radio Resource Control (RRC) message, and a pattern of the contiguous time period of the unlicensed band cell is indicated using the resource configuration information.

5. The method of claim 1, further comprising:
receiving another reference signals through a licensed band cell, and
performing measurement of the another reference signals,
wherein, for the measurement of the another reference signals, a power per RE of the another reference signals is constant over all subframes until power information is newly configured.

6. A User Equipment (UE) for use in a cellular communication system, the UE comprising:
an radio frequency (RF) module including a transceiver; and
a processor connected to the RF module,
wherein the processor is configured to:
receive resource configuration information about an unlicensed band cell through a Physical Downlink Control Channel (PDCCH);
receive reference signals within a contiguous time period of the unlicensed band cell; and
perform a measurement of the reference signals within the contiguous time period of the unlicensed band cell,
wherein, for the measurement of the reference signals, power per Resource Element (RE) of the reference signals is constant within a contiguous time period of the unlicensed band cell,
wherein the contiguous time period of the unlicensed band cell comprises a plurality of contiguous Orthogonal Frequency Division Multiplexing (OFDM) symbols, and
wherein the contiguous time period of the unlicensed band cell is configured based on the resource configuration information.

7. The UE according to claim 6, wherein the contiguous time period of the unlicensed band cell is non-contiguous with another contiguous time period of the unlicensed band cell, and the power per RE of the reference signals of each contiguous time period of the unlicensed band cell is independently configured.

8. The UE according to claim 6, wherein the power per RE of the reference signals includes Cell-specific reference signal (CRS) Energy Per Resource Element (EPRE) or Channel State Information reference signal (CSI-RS) Energy Per Resource Element (EPRE).

9. The UE according to claim 6, wherein a length of the contiguous time period of the unlicensed band cell is pre-indicated through an Radio Resource Control (RRC) message, and a pattern of the contiguous time period of the unlicensed band cell is indicated using the resource configuration information.

10. The UE of claim 6, wherein the processor is further configured to receive another reference signals through a licensed band cell, and to perform measurement of the another reference signals,
wherein for the measurement of the another reference signals, a power per RE of the another reference signals is constant over all subframes until power information is newly configured.

11. A method for performing communication by a Base Station (BS) in a cellular communication system, the method comprising:
transmitting resource configuration information about an unlicensed band cell through a Physical Downlink Control Channel (PDCCH); and
transmitting reference signals within a contiguous time period of the unlicensed band cell,
wherein, for a measurement of the unlicensed band cell, power per Resource Element (RE) of the reference signals is constant within the contiguous time period of the unlicensed band cell, wherein the contiguous time period of the unlicensed band cell comprises a plurality of contiguous Orthogonal Frequency Division Multiplexing (OFDM) symbols, and wherein the contiguous time period of the unlicensed band cell is configured based on the resource configuration information.

12. The method according to claim 11, wherein the contiguous time period of the unlicensed band cell is non-contiguous with another contiguous time period of the unlicensed band cell, and the power per RE of the reference signals of each contiguous time period of the unlicensed band cell is independently configured.

13. The method according to claim 11, wherein the power per RE of the reference signals includes Cell-specific reference signal (CRS) Energy Per Resource Element (EPRE) or Channel State Information reference signal (CSI-RS) Energy Per Resource Element (EPRE).

14. The method according to claim 11, wherein a length of the contiguous time period of the unlicensed band cell is pre-indicated through an Radio Resource Control (RRC) message, and a pattern of the contiguous time period of the unlicensed band cell is indicated using the resource configuration information.

15. The method of claim 11, further comprising:
transmitting another reference signals through a licensed band cell,
wherein for the licensed band cell, a power per RE of the another reference signals is constant over all subframes until power information is newly configured.

16. A Base Station (BS) for use in a cellular communication system, the BS comprising:
an radio frequency (RF) module including a transceiver; and
a processor connected to the RF module, wherein the processor is configured to:
transmit resource configuration information about an unlicensed band cell through a Physical Downlink Control Channel (PDCCH); and
transmit reference signals within a contiguous time period of the unlicensed band cell,
wherein, for a measurement the unlicensed band cell, power per Resource Element (RE) of the reference signals is constant within the contiguous time period of the unlicensed band cell,
wherein the contiguous time period of the unlicensed band cell comprises a plurality of contiguous Orthogonal Frequency Division Multiplexing (OFDM) symbols, and
wherein the contiguous time period of the unlicensed band cell is configured based on the resource configuration information.

17. The BS according to claim 16, wherein the contiguous time period of the unlicensed band cell is non-contiguous with another contiguous time period of the unlicensed band cell, and the power per RE of the reference signals of each contiguous time period of the unlicensed band cell is independently configured.

18. The BS according to claim 16, wherein the power per RE of the reference signals includes Cell-specific reference signal (CRS) Energy Per Resource Element (EPRE) or Channel State Information reference signal (CSI-RS) Energy Per Resource Element (EPRE).

19. The BS according to claim 16, wherein a length of the contiguous time period of the unlicensed band cell is pre-indicated through an Radio Resource Control (RRC) message, and a pattern of the contiguous time period of the unlicensed band cell is indicated using the resource configuration information.

20. The BS of claim 16, wherein the processor is further configured to transmit another reference signals through a licensed band cell, and
wherein for the licensed band cell, a power per RE of the another reference signals is constant over all subframes until power information is newly configured.

* * * * *